US007596223B1

(12) United States Patent
Vogel, III

(10) Patent No.: US 7,596,223 B1
(45) Date of Patent: Sep. 29, 2009

(54) USER CONTROL OF A SECURE WIRELESS COMPUTER NETWORK

(75) Inventor: "J" Leslie Vogel, III, Sausalito, CA (US)

(73) Assignee: Apple Inc., Cupertino, CA (US)

(*) Notice: Subject to any disclaimer, the term of this patent is extended or adjusted under 35 U.S.C. 154(b) by 998 days.

(21) Appl. No.: 09/659,864

(22) Filed: Sep. 12, 2000

(51) Int. Cl.
*H04L 9/00* (2006.01)

(52) U.S. Cl. .................... 380/270; 380/44; 380/273; 380/277; 713/150; 713/168; 713/171

(58) Field of Classification Search .................. 713/200, 713/201, 150, 171, 168; 380/277, 271, 44, 380/270, 273
See application file for complete search history.

(56) References Cited

U.S. PATENT DOCUMENTS

| | | | |
|---|---|---|---|
| 4,200,770 A | 4/1980 | Hellman et al. | |
| 5,148,479 A | 9/1992 | Bird et al. | |
| 5,649,286 A * | 7/1997 | Frerking | 455/435.1 |
| 6,061,790 A * | 5/2000 | Bodnar | 713/171 |
| 6,175,922 B1 * | 1/2001 | Wang | 713/182 |
| 6,178,506 B1 * | 1/2001 | Quick, Jr. | 713/168 |
| 6,185,685 B1 * | 2/2001 | Morgan et al. | 713/183 |
| 6,453,159 B1 * | 9/2002 | Lewis | 455/411 |
| 6,487,657 B1 * | 11/2002 | Brockmann | 713/154 |
| 6,526,506 B1 * | 2/2003 | Lewis | 713/153 |
| 6,587,680 B1 * | 7/2003 | Ala-Laurila et al. | 455/411 |
| 6,594,759 B1 * | 7/2003 | Wang | 713/182 |
| 6,681,017 B1 * | 1/2004 | Matias et al. | 380/277 |
| 6,751,731 B1 * | 6/2004 | Binding et al. | 713/171 |
| 6,889,321 B1 * | 5/2005 | Kung et al. | 713/153 |
| 2002/0067832 A1 * | 6/2002 | Jablon | 380/277 |

FOREIGN PATENT DOCUMENTS

| | | | |
|---|---|---|---|
| EP | 1178644 | * | 6/2001 |
| WO | WO 96/15644 | * | 5/1996 |
| WO | WO01/69838 | * | 9/2001 |

OTHER PUBLICATIONS

Patiyoot et al., "Technique for authentication protocols and key distribution on wireless ATM networks", ACM SIGOPS Operating System Review, vol. 32, Issue 4, Oct. 1998.*

Patiyoot et al., "Cryptographic security technique for wireless networks", ACM SIGOPS Operating Systems Review, vol. 33, Issue 2, Apr. 1999.*

LAN / MAN Standards Committee of the IEEE Computer Society, Supplement to IEEE Standard for Information technology-Part 11: Wireless LAN Medium Access Control (MAC) and Physical Layer (PHY) Specifications: High-speed Physical Layer in the 5 GHZ Band, IEEE Std 802.11a-1999, Dec. 30, 1999, The Institute of Electrical and Electronics Engineers, Inc., New York, New York.

(Continued)

*Primary Examiner*—Tongoc Tran
(74) *Attorney, Agent, or Firm*—Blakely, Sokoloff, Taylor & Zafman LLP

(57) ABSTRACT

A wireless network is established between a station and an access point for the network using a sequence of messages that securely transmit authentication information from the station to the access point for validation by the access point, and subsequently transmit a shared key necessary to establish the wireless network from the access point to the station when the station is validated.

13 Claims, 6 Drawing Sheets

OTHER PUBLICATIONS

LAN / MAN Standards Committee of the IEEE Computer Society, Corrections to Supplement to IEEE Standard for Information technology-Part 11: Wireless LAN Medium Access Control (MAC) and Physical Layer (PHY) Specifications: High-speed Physical Layer in the 5 GHZ Band, IEEE Std 802.11a-1999, Aug. 10, 2000, The Institute of Electrical and Electronics Engineers, Inc., New York, New York.

Bruce Schneier, Applied Cryptography, Second Edition, 1996, pp. 1-5, 31-34, 48, and 513-516, John Wiley & Sons, Inc., New York.

P. Karn and W. Simpson, Photuris: Session-Key Management Protocol, Mar. 1999, RFC 2522, The Internet Society.

W. Simpson, PPP Challenge Handshake Authentication Protocol (CHAP), Aug. 1996, RFC 1994.

P. Karn and W. Simpson, Photuris: Extended Schemes and Attributes, Mar. 1999, RFC 2523, The Internet Society.

* cited by examiner

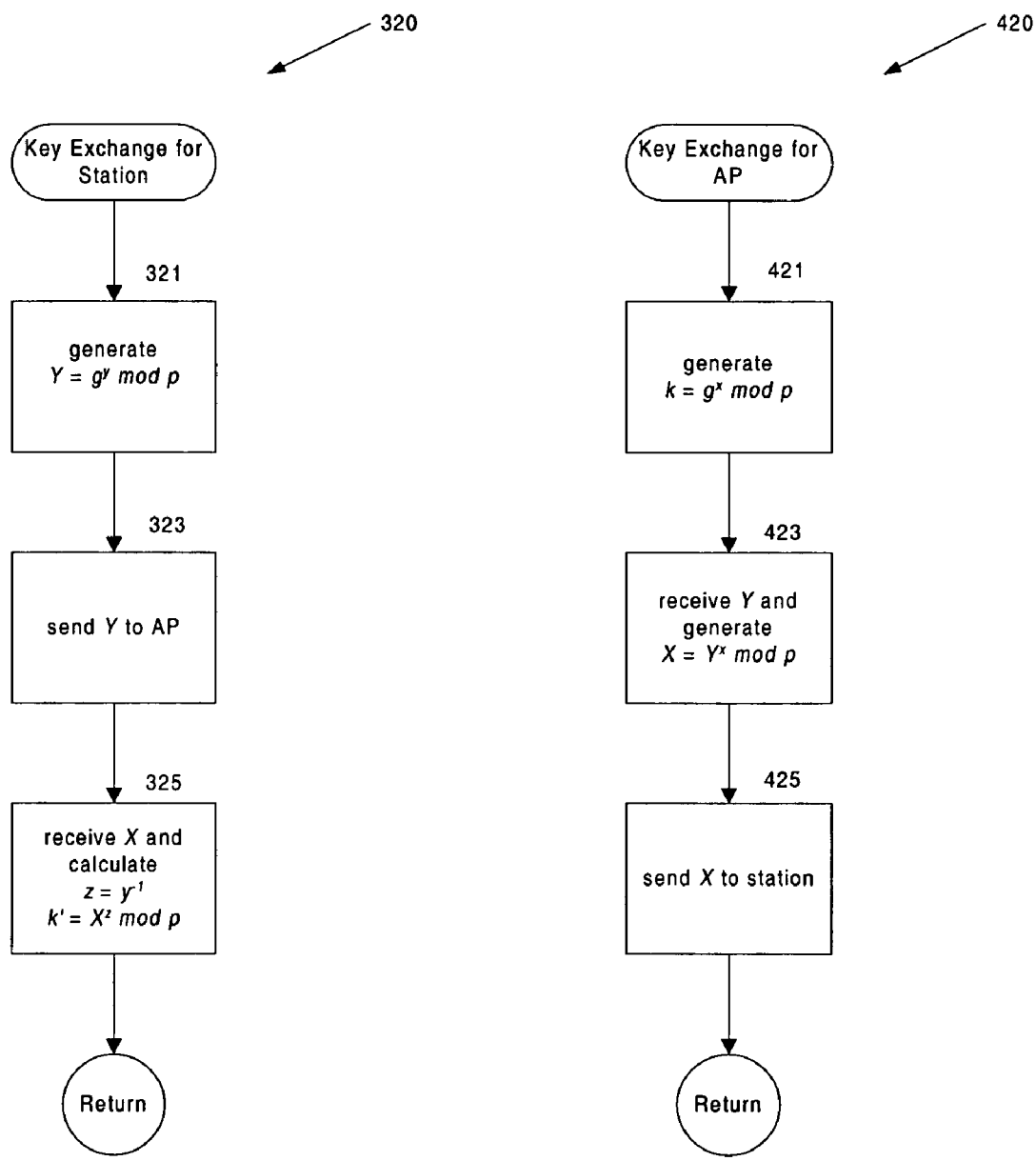

USER CONTROL OF A SECURE WIRELESS COMPUTER NETWORK

FIELD OF THE INVENTION

This invention relates generally to wireless computer networks, and more particularly to establishing a secure wireless network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999, Apple Computer, Inc., All Rights Reserved.

BACKGROUND OF THE INVENTION

As the number and type of resources available to a networked computer increases, the need to connect a computer into a network regardless of the location of the computer also increases. Because of the physical limitations inherent in wired networks, wireless network connections are growing in popularity. With the increase in the use of wireless networks comes the requirement to protect the data being exchanges since wireless signals are more easily captured than signals transmitted over a physical connection.

One approach to the problem of wireless connection security is addressed by the IEEE in the 802.11 standard for *Wireless LAN Medium Access Control (MAC) and Physical Layer (PHY) Specifications*, Draft International Standard ISO/IEC 8802-11 IEEE P802.11/D10, 14 Jan. 1999 (hereinafter "the 802.11 standard"). The 802.11 standard specifies an Infrastructure Network that provides wireless stations access to resources on a wired local area network (LAN) by way of an access point, such as a server on the wired LAN. The Infrastructure Network can be secured using a shared key to establish a Wired Equivalency Privacy (WEP) connection between the access point and each station, such as a desktop, laptop, or handheld computer. The shared keys are distributed to the stations through secure channels outside the wireless network.

The most security is provided when the access point generates a unique shared session key for each station that may potentially connect. The session key is discarded when the connection is terminated. Because of the resources required to create and securely transmit a unique shared key to each potential station for each session, often an access point uses a single, common shared key for all stations for a given period of time, such as a day. However, each user must be informed of the common shared key for the current time period and must program it into the station. Additionally if there is a security breach so that a new common shared key is required before the time period expires, every station must be notified of the new common shared key, and each station must terminate its current session and establish a new connection.

Thus, the existing security mechanisms for wireless networks are cumbersome for the user by requiring constant manual updating of the station to reflect the current shared key, and burdensome on the access point by requiring the frequent generation of the shared keys and the distribution of those keys outside of the wireless network.

SUMMARY OF THE INVENTION

The above-mentioned shortcomings, disadvantages and problems are addressed by the present invention, which will be understood by reading and studying the following specification.

A secured wireless communications channel between an access point and a station is established by a series of message exchanged between the access point and the station. The station sends a request for a security preference for the access point to the access point. The access point sends the security preference in response to the request when the access point can support the channel. When the security preference is shared key, the station generates authentication information using a first key and sends the authentication information to the access point. The access point uses the authentication information to validate the station. If the station is valid, the access point encrypts a channel key with a second key and sends the encrypted result to the station. The station decrypts the channel key and uses it to establish the wireless channel.

The authentication information can be a user name and password, an encrypted challenge such as used in the Challenge Handshake Authentication Protocol, or other types of data typically used to authenticate clients on a network. In one aspect, the first and second keys are identical keys. In another aspect, the first key is a public key for the access point and the second key is a public key for the station.

Using the invention, the user is required to program the station only once—when it is initially setup for the wireless network. Because each station must authenticate itself to the access point before it can establish the wireless channel using a channel key, the access point can quickly secure the network against a security breach of a common channel key by disabling the login abilities of a now-invalid user without having to terminate all the other stations or having to generate a new common channel key. Thus, the burden on the access point of generating and distributing the common channel key is greatly reduced and the security of the wireless network when using a common channel key is enhanced.

The present invention describes systems, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 3A-B are flowcharts of a method to be performed by a station computer according to an embodiment of the invention;

FIGS. 4A-B are flowcharts of a method to be performed by an access point computer according to an embodiment of the invention.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

Figure 1:
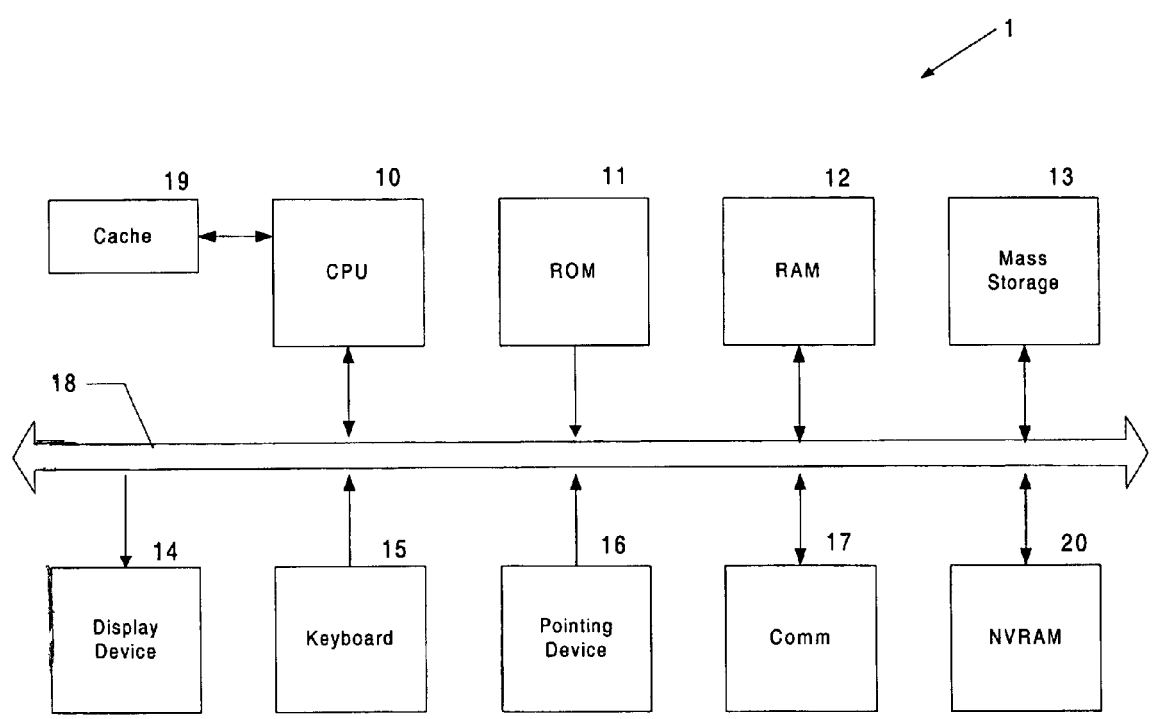
FIG. 1 is a diagram of one embodiment of a computer system environment suitable for practicing the invention.

The following description of FIG. 1 is intended to provide an overview of computer hardware and other operating components suitable for implementing the invention, but is not intended to limit the applicable environments. Various details provided in this description are specific to Macintosh computer systems. Note, however, that the concepts of the present invention are not limited to application to a Macintosh platform. For example, these concepts may also be applied to x86 processor based computer systems, as well as other types of computing platforms.

FIG. 1 illustrates a computer system 1 in which the present invention may be implemented. While FIG. 1 illustrates the major components of a computer system, it is not intended to represent any particular architecture or manner of interconnecting the components; such details are not germane to the present invention.

As shown, the computer system 1 of FIG. 1 includes a microprocessor 10, a read-only memory (ROM) 11, random access memory (RAM) 12, each connected to a bus system 18. The bus system 18 may include one or more buses connected to each other through various bridges, controllers and/or adapters, such as are well-known in the art. For example, the bus system may include a "system bus" that is connected through an adapter to one or more expansion buses, such as a Peripheral Component Interconnect (PCI) bus, or the like. Also coupled to the bus system 18 are a mass storage device 13, a display device 14, a keyboard 15, a pointing device 16, a communication device 17, and non-volatile RAM (NVRAM) 20. A cache memory 19 is coupled to the microprocessor 10.

Microprocessor 10 may be any device capable of executing software instructions and controlling operation of the computer system, such as a PowerPC processor, for example, or an x86 class microprocessor. ROM 11 may be a non-programmable ROM, or it may be a programmable ROM (PROM), such as electrically erasable PROM (EEPROM), Flash memory, etc.

Mass storage device 13 may include any device for storing suitably large volumes of data, such as a magnetic disk or tape, magneto-optical (MO) storage device, or any variety of Digital Versatile Disk (DVD) or compact disk ROM (CD-ROM) storage. The data is often written, by a direct memory access process, into RAM 12 during execution of software in the computer system 1. One of skill in the art will immediately recognize that the term "computer-readable medium" includes any type of storage device that is accessible by the microprocessor 10.

Display device 14 may be any device suitable for displaying alphanumeric, graphical and/or video data to a user, such as a cathode ray tube (CRT), a liquid crystal display (LCD), or the like, and associated controllers. Pointing device 16 may be any device suitable for enabling a user to position a cursor or pointer on display device 14, such as a mouse, trackball, touchpad, stylus with light pen, voice recognition hardware and/or software, etc.

Communication device 17 may be any device suitable for or enabling the computer system 1 to communicate data with a remote processing system over a communication link, such as a conventional telephone modem, a cable television modem, an Integrated Services Digital Network (ISDN) adapter, a Digital Subscriber Line (xDSL) adapter, a network interface card (NIC), an Ethernet adapter, a wireless transmitter/receiver, etc.

It will be appreciated that the computer system 1 is one example of many possible computer systems which have different architectures. The computer system of FIG. 1 may be, for example, an Apple Macintosh computer, such as an Apple iMac computer. FIG. 1 is also illustrative of personal computers based on an Intel microprocessor. Such personal computer often have multiple buses, one of which can be considered to be a peripheral bus. Network computers are another type of computer system that can be used with the present invention. Network computers do not usually include a hard disk or other mass storage, and the executable programs are loaded from a network connection into the RAM 12 for execution by the microprocessor 10. A Web TV system, which is known in the art, is also considered to be a computer system according to the present invention, but it may lack some of the features shown in FIG. 1, such as certain input or output devices. A typical computer system will usually include at least a processor, memory, and a bus coupling the memory to the processor.

Furthermore, one of skill in the art will immediately appreciate that the invention can be practiced with other computer system configurations, including hand-held devices, multi-processor systems, microprocessor-based or programmable consumer electronics, network PCs, minicomputers, mainframe computers, and the like. The invention can also be practiced in distributed computing environments where tasks are performed by remote processing devices that are linked through a communications network.

It will be apparent from this description that aspects of the present invention may be embodied, at least in part, in software. That is, the technique may be carried out in a computer system in response to its microprocessor executing sequences of instructions contained in a memory, such as ROM 11, RAM 12, mass storage device 13, cache 19, or a remote storage device. In various embodiments, hardwired circuitry may be used in place of, or in combination with, software instructions to implement the present invention. Thus, the technique is not limited to any specific combination of hardware circuitry and software, nor to any particular source for the instructions executed by a computer system.

In addition, throughout this description, various functions and operations are described as being performed by or caused by software code (or other similar phrasing) to simplify description. However, those skilled in the art will recognize that what is meant by such expressions is that the functions result from execution of the code by a processor, such as microprocessor 10.

It will also be appreciated that the computer system 1 is controlled by operating system (OS) software which includes a file management system, such as a disk operating system, which is part of the operating system software. The file management system is typically stored in the mass storage 13 and causes the microprocessor 10 to execute the various acts required by the operating system to input and output data and to store data in memory, including storing files on the mass storage 13.

Figure 2:
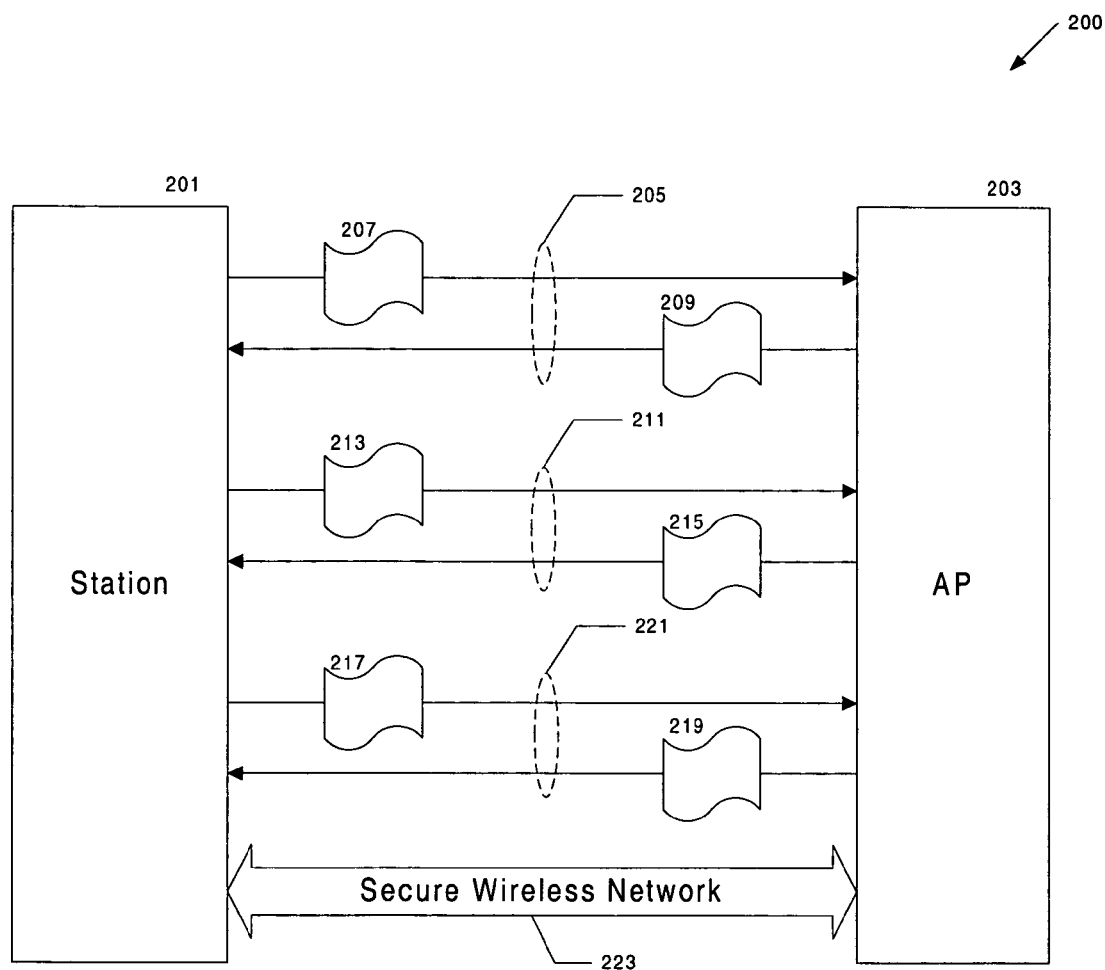
FIG. 2 is a diagram illustrating a system-level overview of embodiments of the invention.

A system level overview of the operation of embodiments of the invention is described with reference to FIG. 2 that illustrates the establishment 200 of a secure wireless network connection between a user station 201 and a wireless access point (AP) 203. The user station 201 and the AP 203 are computers, such as computer system 1 in FIG. 1, that are coupled together through wireless transmitter/receivers serving as communication device 17. The AP 203 is further coupled into a wired local area network (LAN) through an second communications device 17, such as a network interface card. The wireless network is secured by encrypting the data exchanged between the user station 201 and the AP 203 using a channel key that is shared between the user station and the AP and a pre-defined shared key algorithm. The channel key can be common for all stations for a given period of time, or can be unique to each station.

The user station 201 sends a request 207 for a connection to the AP 203. If the AP 203 can handle a new connection, it sends its security preference 209, in this case "shared key," to the user station 201. The request 207 and the security preferences 209 form an inquiry sequence 205 between the station 201 and the AP 203.

In one embodiment, the station 201 and the AP 203 next perform a key exchange sequence 211 based on a pre-determined key exchange security algorithm. Station 201 chooses a secret station key and generates a value 213 using the secret station key and the key exchange security algorithm. The station 201 sends the value 213 to the AP 203. The AP 203 chooses a secret AP key and generates a self-distributed key using the secret AP key and the security algorithm. The AP 203 also generates a value 215 using the value 213, the secret AP key, and the security algorithm. The AP 203 sends the value 215 to the station 201. The station 201 uses the value 215, the secret station key, and the security algorithm to calculate the self-distributed key. It will be appreciated that the key exchange security algorithm must be mathematically constructed in a fashion that permits the station 201 to obtain the self-distributed key as described while generating values that cannot be used to determine the secret keys of either the station or the AP. One such algorithm is the Diffie-Hellman key exchange algorithm as incorporated into the Hughes transmission protocol and is as explained in more detail below.

The station 201 now authenticates itself by transmitting authentication information to the AP 203. In the present example, the station 201 encrypts the user name and password using the self-distributed key and the pre-defined shared key algorithm to create the authentication information 217 that is sent to the AP 203. The AP 203 decrypts the user name and password and checks them for validity. Assuming the user name and password are valid, the AP 203 encrypts the current channel key using the self-distributed key and the pre-defined shared key algorithm and sends the encrypted result 219 to the station 201 to complete an authentication sequence 221. Once the station 201 has decrypted the current channel key, it terminates the setup connection used by the sequences 205, 211, 221 and establishes the secure wireless network 223 by transmitting data to the AP 203 encrypted with the current channel key. In an alternate embodiment, a standard encryption algorithm, such as RC4, is substituted for the pre-defined shared key algorithm.

In another embodiment, the key exchange sequence 211 begins with the station 201 transmitting a public key 213 for the station to the AP 203. The AP 203 responds by transmitting a public key 215 for the AP to the station 201. The station 201 uses the AP public key 215 to encrypt the user name and password, and sends the authentication information 217 to the AP 203. The AP 203 decrypts the result 217 using a private key corresponding to the AP public key. After validating the user name and password, the AP 203 encrypts the current channel key with the station public key 213 and transmits the encrypted result 219 to the station 201. The station 201 decrypts the current channel key using a private key corresponding to the station public key and terminates the setup connection prior to establishing the secure wireless network 223 as described above.

A variation on the public/private key setup connection assumes that the station 201 and the AP 203 exchange public keys using the key exchange sequence 211 only the first time a secure wireless network is established between them. Each stores the other's public key for subsequent connections. In this embodiment, the AP 203 determines which stored public key, if any, is appropriate based on a station identifier contained in the request 207. Alternatively, the public keys can be exchanged outside the wireless network.

In a further embodiment, the authentication sequence 221 uses the Challenge Handshake Authentication Protocol (CHAP). Each station is assigned a CHAP key which can be the self-distributed key created through the key exchange sequence 211 as described above, or can be an unique key chosen by either the AP 202 or the station 201 and transmitted to the other through a mechanism outside the wireless network. When the station 201 requests a connection 207, the AP 203 sends a challenge to the station 201 either as part of the security preferences 209 or as a separate message (not shown in FIG. 2). The station 201 encrypts the challenge with its CHAP key to create the authentication information 217 that is sent to the AP 203. The AP 203 also encrypts the challenge with the station's assigned CHAP key. If the authentication information 217 received from the station 201 matches the challenge as encrypted by the AP 203, the station 201 is validated and the AP 203 encrypts the current channel key with the CHAP key and sends it 219 to the station 201. In this embodiment, the user name and password is not sent to the AP 203 across the wireless network, reducing the possibility of their being intercepted.

The authentication sequence prevents the connection of a station that is fraudulently using a common channel key and thus reduces the number of time that a common channel key must be reissued. Because the user must program the station only once, when it is initially setup for the wireless network, the invention reduces user confusion and makes the wireless network easier to use. While the invention is not limited to any particular sequence of key exchange messages, for sake of clarity a simplified sequence has been described. It will be readily apparent that other message sequences that result in the secure transmission of the authentication information and the shared channel key are equally applicable.

Next, the particular methods of the invention are described in terms of computer software with reference to a series of flowcharts shown in FIGS. 3A-B and 4A-B. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or a produce a result.

Figure 3A:
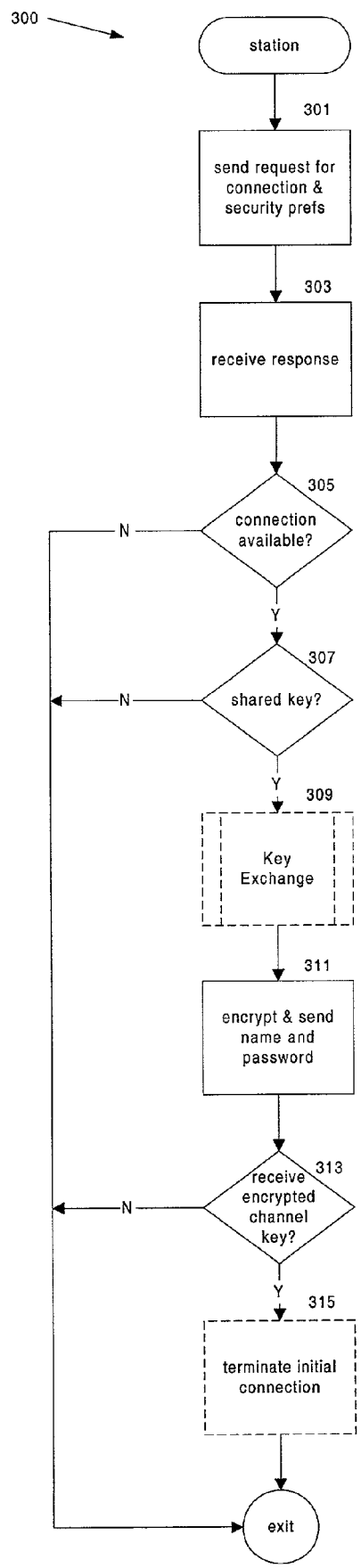

Referring first to FIG. 3A, the acts to be performed by a computer executing the station method 300 are shown. The station method 300 begins by sending a request for a connection to an AP (block 301). The request message also includes an inquiry regarding the security preferences of the AP. The response received (block 303) will indicate whether a connection is available (block 305) and if so, the type of security preference (block 307). If there is no connection available, or if the security preference is not "shared key," the security method 300 exits. It will be appreciated that an available connection using a different security preference can be established through other methods not germane to the present invention.

When necessary, a key exchange method is performed by the station computer at block 309 (shown in phantom). The key exchange method for the station corresponds to the actions described in FIG. 2 for the key exchange sequence 211. A particular embodiment using the Hughes transmission protocol for the key exchange method is described in detail below with reference to FIG. 3B. The user name and password are next encrypted using the appropriate key, e.g., the self-distributed key or the AP public key, and sent to the AP (block 311). If the AP responds with an encrypted channel key (block 313), the station can establish the secure network connection by transmitting a message encrypted with the channel key as is conventional and not illustrated. Optionally, the method 400 terminates the initial connection before establishing the secure network connection (block 315).

Figure 4A:
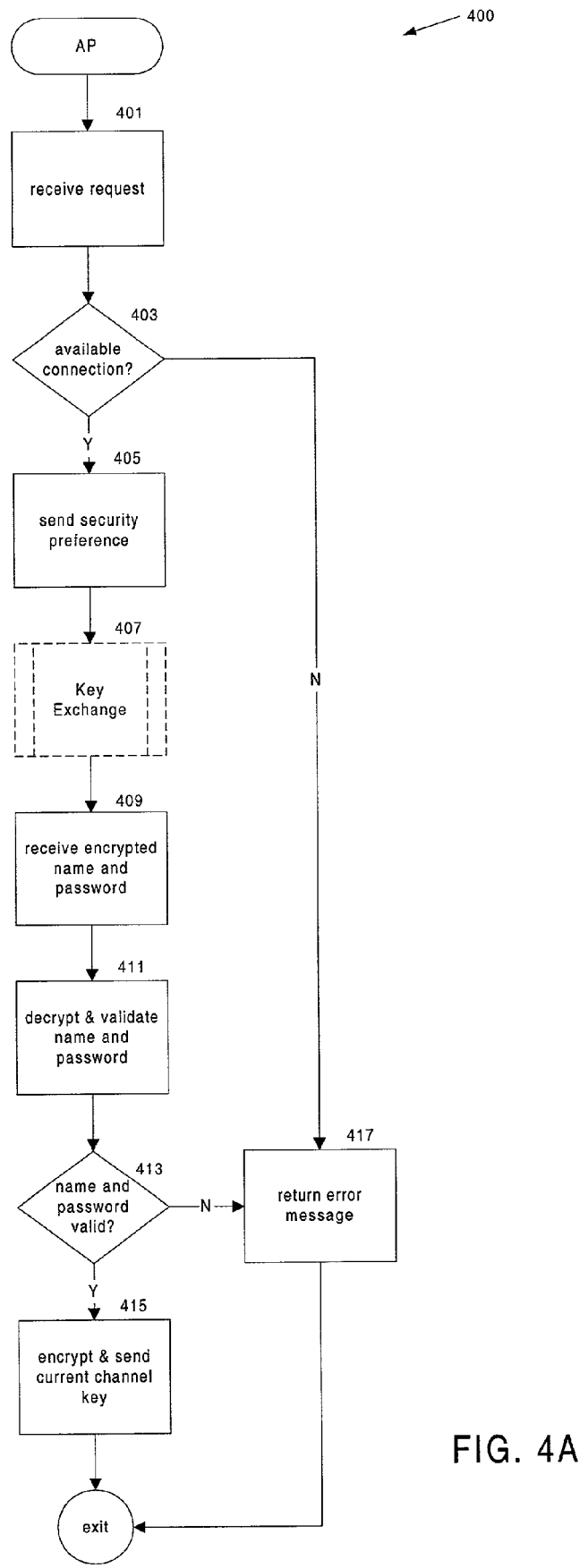

The corresponding method 400 to be executed on a computer acting as the AP is illustrated in FIG. 4A. The AP method 400 receives the request from the station at block 401, determines if there is an available connection (block 403) and responds with the AP security preferences if so (block 405). The AP computer next performs a key exchange method at block 407 when required. A embodiment for the AP key exchange method using the Hughes transmission protocol is described in detail below with reference to FIG. 4B.

When the AP computer receives the encrypted user name and password (block 411), the method 400 decrypts and validates the user name and password against the valid users for the AP (block 411). Assuming the user name and password are valid (block 413), the AP method encrypts the current channel key for the station using the appropriate key, e.g., the station public key or the self-distributed key, and sends the encrypted result to the station (block 413). The participation of the AP in the subsequently-established secure network is well-known and not illustrated. The embodiment illustrated in FIG. 4A returns error messages to the station at block 417 when a connection is not available or when the user name and password cannot be validated.

Turning now to FIGS. 3B and 4B, one embodiment of key exchange methods 320, 420 for the station and AP is described. The key exchange is based on the Hughes transmission protocol which incorporates the Diffie-Hellman security algorithm shown in formula 1 in which n, g and p are large integers, such that g is less than p but greater than 1.

$$k = g^n \bmod p \quad \text{(formula 1)}$$

The AP chooses a value for n for each station and generates a unique shared secret key k using formula 1. The values of n assigned to the stations are kept secret by the AP However, because it is difficult to calculate n given the result of the security algorithm, the values of g and p do not have to be secret, nor do they have to be unique to each station. In one embodiment, the values of g and p are sent to the station by the AP as part of the response message at block 307 in FIG. 3A. In an alternate embodiment, the values of g and p are given to a user when the user's name and password are initially registered with the AP. The user then inputs the values to the station. In still another embodiment, the AP publishes the values of g and p and all stations use the same values. One advantage of using the same values of g and p for all stations, is that the values can be hardcoded into the stations, and all APs, when they are manufactured, eliminating the complexity of distributing the values through the network and also eliminating errors inherent in having the user manually input the values to a station.

In the interest of clarity, the acts performed by the computers executing the station and the AP key exchange methods 320, 420 are described in an interleaved fashion, beginning with the key exchange method for the AP 420.

As described above, the AP selects a random large integer x to be the unique value of n for the station (the secret AP key) and generates the self-distributed key k using formula 1 (block 421 in FIG. 4B). Similarly, the station selects a random large integer y (the secret station key) and calculates a value Y using formula 2 (block 321 in FIG. 3B).

$$Y = g^y \bmod p \quad \text{(formula 2)}$$

The station sends Y to the AP (block 323). When the AP receives Y, it generates a value X using formula 3 (block 423), which it sends to the station (block 425).

$$X = Y^x \bmod p \quad \text{(formula 3)}$$

The station calculates k from X using formulas 4 and 5 (block 325).

$$z = y^{-1} \quad \text{(formula 4)}$$

$$k = X^z \bmod p \quad \text{(formula 5)}$$

At this point, both the station and the AP are in possession of the self-distributed key k and can begin the encrypted authentication process described previously. One of the advantages of the Hughes transmission protocol is that it places the majority of the calculation burden on the station, not the AP, thus allowing the AP to service more stations simultaneously.

The particular methods performed by a station and AP for an embodiment of the invention have been described. The method performed by a computer acting as a station has been shown by reference to a flowchart in FIG. 3A including all the acts from 301 until 315. The method performed by a computer acting as an access point by reference to a flowchart in FIG. 4A including all the acts from 401 until 417. Additionally, the use of the Hughes key exchange protocol in an embodiment of the invention has been shown by reference to flowcharts in FIGS. 3B and 4B including all the acts from 321 until 325 and from 421 until 425, respectively.

Figure 5:
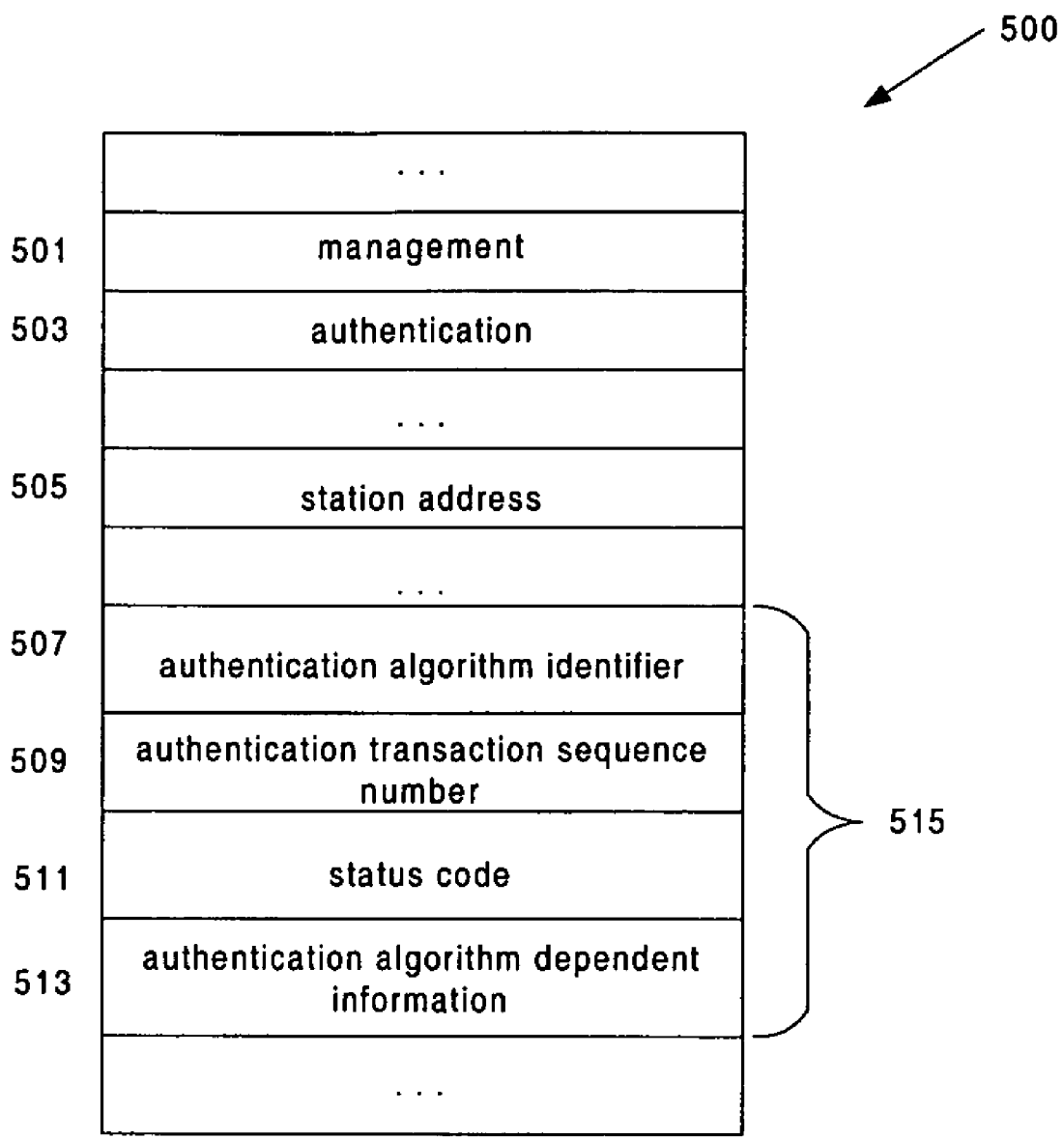
FIG. 5 is a diagram of an message data structure for use in an implementation of the invention.

The invention is particularly suited for use with Infrastructure Networks defined by the 802.11 standard. An Infrastructure Network provides wireless stations access to resources on a wired LAN by way of an AP. The AP specifies whether access to the LAN is open to all stations ("Open System") or secured through a Wired Equivalent Privacy (WEP) protocol using a shared key and a WEP encryption algorithm ("Shared Key"). The 802.11 standard assumes that the shared WEP key is distributed though some secure channel prior to creating the WEP connection between the AP and a station. The invention provides such a secure channel as described above by exchanging messages between the station and the AP using the 802.11 standard message format. In one embodiment shown in FIG. 5, a data structure 500 for the invention's messages corresponds to an 802.11 management frame for authentication information. It will be appreciated that only the fields germane to the invention are illustrated in FIG. 5 and that one of skill in the art will readily understand the location and use of the omitted fields upon reading the following description in light of the 802.11 standard.

Fields 501 and 503 contains values that define the type and sub-type of the data structure, respectively, i.e., management and authentication. A station address field 505 contains a value for the station identity for those messages sent from the station to the AP. Fields 507, 509, 511, and 513 collectively form a frame body 515 for the message and contain information specific to the message being transmitted as described next.

The particular messages used by the invention can be divided into two groups. The first group is referred to as the AP's Choice group and contains the messages 207, 209 of the inquiry sequence 205 in FIG. 2. The second group is referred to as the Name and Password group and contains the messages 213, 215 for the key exchange sequence 211 and the messages 217, 219 for the authentication sequence 221. The message data structures are described next with reference to the corresponding messages in FIG. 2.

The frame body 515 for an inquiry message 207 from the station to the AP specifies that is it a request for AP's Choice of authentication algorithm in the authentication algorithm identifier field 507 and the number "1" in the authentication transaction sequence number field 509. The other fields are empty. The AP responds with a security preferences message 209 containing a value for its preferred method of authentication in field 507, e.g. Shared Key or Open System, and a sequence number of "2" in field 509 if a connection is available. If a connection is unavailable, the message 209 contains an error code in the status code field 511.

Assuming that a connection is available and that the AP's choice of authentication is Shared Key, in an embodiment using the Hughes key exchange protocol, the station sends a message 213 containing a value for name and password authentication in field 507 and the value of Y (calculated by the station using the Diffie-Hellman algorithm as described above) in the authentication algorithm dependent information field 513. The sequence number in field 509 is "1." The AP responds with a message 215 containing the same value in field 507, the value of X in field 513, and a sequence number of "2" in field 509.

The key exchange sequence 211 is now complete because the station has the information necessary to calculate the self-distributed key as described previously. The station begins the authentication sequence 221 by using the WEP encryption algorithm to encrypt the user name and password with the self-distributed key and storing the result in field 513 of the message 217 and a sequence number of "3" in field 509. Field 507 contains the name and password authentication value as before. The AP decrypts the user name and password and validates them. If the user name or password are valid, the AP encrypts the shared WEP key, i.e. the shared channel key, with the self-distributed key and stores the result in field 513 to create message 219. The AP also stores the value associated with Shared Key authentication in field 507, and a "4" in field 509. If the user name or password are invalid, the message 219 contains an error code in the status code field 511 and no data in field 513.

The establishment of a secured wireless network channel between a station and an access point has been described that requires the user to program his or her station only once while simultaneously enhancing the security of a wireless network that uses a common shared key. A particular embodiment has also been described that uses the Hughes transmission protocol to reduce the processing burden on the AP, thus enabling the AP to service more stations simultaneously. An embodiment applicable for use with an IEEE 802.11 Infrastructure Network uses a message data structure that conforms to the format specified by the 802.11 standard, allowing use of the invention in such networks while adhering to the standard.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to networks, both wired and wireless, is meant to include all such network environments. Therefore, it is manifestly intended that this invention be limited only by the following claims and equivalents thereof.

What is claimed is:

1. A computerized method of establishing a secure wireless communication channel between an access point and a station, the channel being encrypted with a channel key, the method comprising:

the access point receiving a connection request from the station to initiate a setup connection between the access point and the station;

the access point sending a shared key to the station in response to the connection request if the access point is capable of handling a connection to the station;

the access point selecting a secret access point key subsequent to sending the shared key;

the access point generating a self-distributed key using the secret access point key;

the access point generating a first value using the secret access point key and a second value from the station, wherein the second value has been generated by the station using a secret station key;

the access point sending the first value to the station, wherein the station uses the first value and the secret station key to calculate the self-distributed key;

the access point receiving an encrypted user name and an encrypted password from the station, wherein the station has encrypted the user name and the password with the self-distributed key; and the access point decrypting the user name and the password to check for validity;

the access point encrypting the channel key using the self-distributed key if the user name and the password are valid; and the access point sending the encrypted channel key to the station to cause the station to terminate the setup connection and to establish a secured connection with the access point using the channel key.

2. The method of claim 1, wherein the access point generating the self-distributed key using the secret access point key comprises:

the access point executing a security algorithm to generate the self-distributed key using the secret access point key.

3. The method of claim 2, wherein the security algorithm comprises $g^n \bmod p$.

4. A computerized method of establishing a secure wireless communication channel between an access point and a station, the channel being encrypted with a channel key, the method comprising:

the station sending a connection request to the access point to initiate a setup connection between the access point and the station;

the station generating a first value using a secret station key;

the station sending the first value to the access point, wherein the access point uses the first value and secret access point key to generate a second value;

the station receiving the second value from the access point;

the station using the second value and a secret station key to calculate a self-distributed key previously generated by the access point using the secret access point key;

the station encrypting a user name and a password with the self-distributed key; and sending the encrypted user name and encrypted password to the access point to be validated;

the station receiving the channel key in an encrypted form from the access point if the user name and the password are validated by the access point; and the station decrypting the encrypted channel key using the self-distributed key;

the station terminating the setup connection; and the station establishing a secured connection with the access point using the channel key decrypted.

5. The method of claim 4, wherein the access point executes a security algorithm to generate the self-distributed key using the secret access point key.

6. The method of claim 5, wherein the security algorithm comprises $g^n$ mod p.

7. A computer-readable medium having stored thereon executable instructions to cause a processor to perform a method for establishing a secure wireless communication channel between an access point and a station, the channel being encrypted with a channel key, the method comprising:

the access point receiving a connection request from the station to initiate a setup connection between the access point and the station;

the access point sending a shared key to the station in response to the connection request if the access point is capable of handling a connection to the station;

the access point selecting a secret access point key subsequent to sending the shared key;

the access point generating a self-distributed key using the secret access point key;

the access point generating a first value using the secret access point key and a second value from the station, wherein the second value has been generated by the station using a secret station key;

the access point sending the first value to the station, wherein the station uses the first value and the secret station key to calculate the self-distributed key;

the access point receiving an encrypted user name and an encrypted password from the station, wherein the station has encrypted the user name and the password with the self-distributed key; and the access point decrypting the user name and the password to check for validity;

the access point encrypting the channel key using the self-distributed key if the user name and the password are valid; and the access point sending the encrypted channel key to the station to cause the station to terminate the setup connection and to establish a secured connection with the access point using the channel key.

8. The computer-readable medium of claim 7, wherein the access point generating the self-distributed key using the secret access point key comprises:

the access point executing a security algorithm to generate the self-distributed key using the secret access point key.

9. The computer-readable medium of claim 8, wherein the security algorithm comprises $g^n$ mod p.

10. A computer-readable medium having stored thereon executable instructions to cause a processor to perform a method for establishing a secure wireless communication channel between an access point and a station, the channel being encrypted with a channel key, the method comprising:

the station sending a connection request to the access point to initiate a setup connection between the access point and the station;

the station generating a first value using a secret station key;

the station sending the first value to the access point, wherein the access point uses the first value and secret access point key to generate a second value;

the station receiving the second value from the access point;

the station using the second value and a secret station key to calculate a self-distributed key previously generated by the access point using the secret access point key;

the station encrypting a user name and a password with the self-distributed key; and sending the encrypted user name and the encrypted password to the access point to be validated;

the station receiving the channel key in an encrypted form from the access point if the user name and the password are validated by the access point; and the station decrypting the encrypted channel key using the self-distributed key;

the station terminating the setup connection; and the station establishing a secured connection with the access point using the channel key decrypted.

11. The computer-readable medium of claim 10, wherein the access point executes a security algorithm to generate the self-distributed key using the secret access point key.

12. The computer-readable medium of claim 11, wherein the security algorithm comprises $g^n$ mod p.

13. A secure wireless network comprising:

a station operable for sending a connection request to initiate a setup connection and for generating a first value using a secret station key;

an access point wirelessly and communicably coupled to the station, the access point operable for sending a shared key to the station in response to the connection request if the access point is capable of handling a connection with the station, for selecting a secret access point key subsequent to sending the shared key, for generating a self-distributed key using the secret access point key, for generating a second value using the secret access point key and the first value from the station, for sending the first value to the station, and for encrypting a channel key using the self-distributed key if the user name and the password are validated and for sending the encrypted channel key to the station, wherein the station is further operable for calculating the self-distributed key using the second value and the secret station key, for encrypting a user name and a password with the self-distributed key, and for sending the encrypted user name and the encrypted password to the access point to be validated, and wherein the station is further operable for decrypting the encrypted channel key using the self-distributed key, for terminating the setup connection, and for establishing a secured connection with the access point using the channel key.

* * * * *

UNITED STATES PATENT AND TRADEMARK OFFICE
CERTIFICATE OF CORRECTION

PATENT NO. : 7,596,223 B1  Page 1 of 1
APPLICATION NO. : 09/659864
DATED : September 29, 2009
INVENTOR(S) : "J" Leslie Vogel, III It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1303 days.

Signed and Sealed this

Twenty-eighth Day of September, 2010

David J. Kappos
*Director of the United States Patent and Trademark Office*